United States Patent [19]
Gokita

[11] Patent Number: 4,630,128
[45] Date of Patent: Dec. 16, 1986

[54] COLOR IMAGE FORMING APPARATUS WITH INTERRUPTION CONTROL

[75] Inventor: Masami Gokita, Tokyo, Japan

[73] Assignee: Kabushiki Kaisha Toshiba, Kawasaki, Japan

[21] Appl. No.: 639,343

[22] Filed: Aug. 10, 1984

[51] Int. Cl.⁴ .................. G03G 15/00; H04N 1/27
[52] U.S. Cl. ............................ 358/296; 358/300; 355/14 R; 355/14 C; 346/150; 346/160; 346/16
[58] Field of Search .............. 346/150, 153.1, 160, 346/76 R, 108; 358/296, 300, 302; 355/14 R, 14 C

[56] References Cited

U.S. PATENT DOCUMENTS 4,273,439  6/1981  Markham et al. ............ 355/14 R X
4,315,685  2/1982  Inuzuka et al. ................ 355/14 R Primary Examiner—E. A. Goldberg
Assistant Examiner—Patrick W. Foster
Attorney, Agent, or Firm—Cushman, Darby & Cushman

[57] ABSTRACT

An interruption control system for an image forming apparatus with a scanning means for optically scanning a document comprises an image forming means, including a feed section for feeding an image forming medium, an image forming section for forming an image on the image forming medium using image information derived from the scanning means, a temporary storing section for temporarily storing the image forming medium when the image forming section forms an image, and a discharge section for discharging the image forming medium bearing an image formed by the image forming section. It also has an interruption commanding means for commanding the image forming means to interrupt the image forming operation, and an interruption control means, responsive to an interruption command, for checking the present location of the image forming medium, the feed section, the image forming section, the temporary storing section or the discharge section, and for setting up an optimum processing mode during the subsequent operation of the image forming medium on the basis of the checked result.

5 Claims, 13 Drawing Figures

COLOR IMAGE FORMING APPARATUS WITH INTERRUPTION CONTROL

BACKGROUND OF THE INVENTION

This invention relates to an interruption control system for an image forming apparatus, and more particularly to an interruption control system for an apparatus which optically scans a document to form an image of the document on an image forming medium.

Known image forming apparatuses of this type are, for example, electronic copy machines, thermal transfer color copy machines, laser printers and thermal printers. The image forming apparatus is comprised of a scanning means for optically scanning a document to produce image information as optically picked up, and an image forming means for forming the image of the document on an image forming medium such as paper according to the image information derived from the scanning means.

During the image forming operation, an operator frequently encounters the need to interrupt the operation of the apparatus. To satisfy such a desire, the image forming apparatus currently used is provided with an input means for inputting, by means of a stop key, into the image forming apparatus a stop signal to interruptively stop the apparatus during its operation. In such an interrupted operation, the paper which is in the process of forming an image is automatically fed to the outside of the machine, regardless of its image forming state. Therefore, the paper having no image formed thereon as well as the paper having an image imperfectly formed due to the interruption, is discharged to the outside of the apparatus. Therefore, the paper is wasted.

Of those image forming apparatuses, the apparatus for forming multicolor images, such as the thermal transfer color copy machine, particularly suffers from another problem. A jam tends to occur during the course of the paper being discharged during an interruption. This arises from the fact that the paper transfer path of the multicolor image forming apparatus is more complicated in structure than that of the monocolor apparatus.

SUMMARY OF THE INVENTION

Accordingly, an object of the present invention is to provide, by introducing a novel technical idea, an interruption control system for an image forming apparatus which eliminates the wasteful use of the image forming medium when the image forming operation is interrupted, and which prevents the image forming medium from being jammed.

According to the present invention, an interruption control system for an image forming apparatus with a scanning means for optically scanning a document comprises an image forming means, including a feed section for feeding an image forming medium on which an image is to be formed, an image forming section which forms an image on the image forming medium using image information derived from the optically scanning means, a temporary storing section for temporary storing the image forming medium when the image forming section forms an image, and a discharge section for discharging the image forming medium bearing the image formed by the image forming section. The system also includes an interruption commanding means for commanding the image forming means to interrupt the image forming operation, and an interruption control means, responsive to the interruption command, for checking the present location of the image forming medium, the feed section, the image forming section, the temporary storing section or the discharge section, and for setting up an optimum processing mode during the subsequent operation of the image forming medium on the basis of the checked result.

With such an arrangement, the interruption of the image forming operation is appropriately controlled according to the present location of the image forming medium, thereby saving the image forming medium and preventing the occurrence of a jam.

BRIEF DESCRIPTION OF THE DRAWINGS

This and other objects and features of the present invention may be best understood by reference to the specification and accompanying drawings, in which.

DETAILED DESCRIPTION OF THE PREFERRED EMBODIMENT

A preferred embodiment of the present invention will be described referring to the accompanying drawings.

Figure 1:
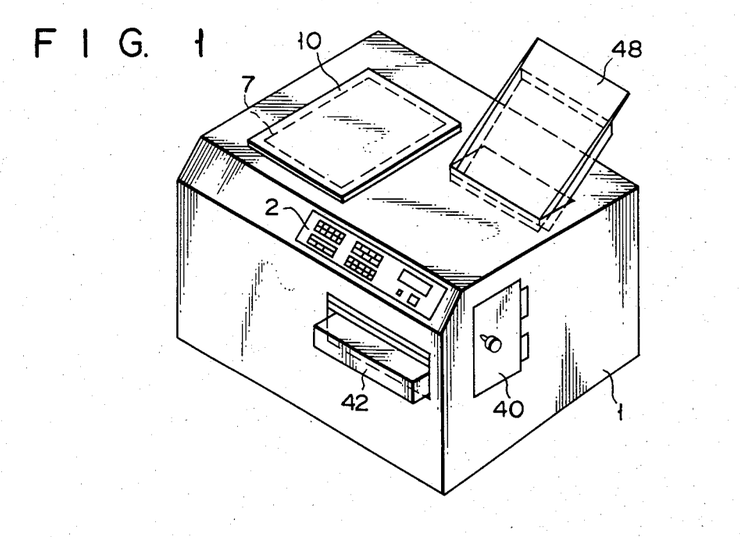
FIG. 1 perspectively illustrates a thermal transfer color copy machine in which an embodiment of an interruption control system according to the present invention is applied.
Figure 2:
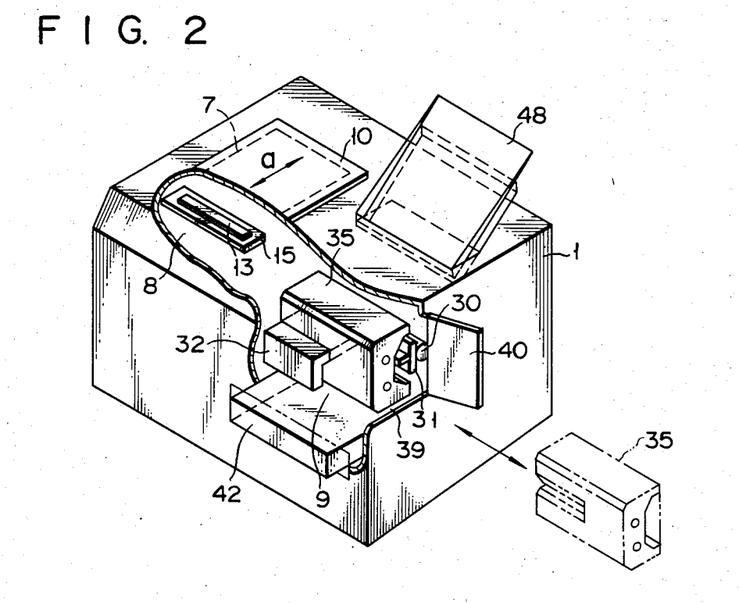
FIG. 2 perspectively illustrates the copy machine partially broken away to show part of the inside of the copy machine.

FIGS. 1 and 2 show a thermal color copy machine into which an interruption control system of the present invention is incorporated. As shown, a main frame 1 of the color copy machine has an operation panel 2 on the front side thereof. A scanning means 8 and an image forming means 9 are respectively located on the left and the right portions of the top surface of the main frame 1, as viewed from the front side of the copy machine. The scanning means 8 optically scans a document (not shown) placed on a document table 7 formed of a transparent glass plate, and picks up image information of the document. A cover 10, hingedly mounted to the main frame 1, is provided on the document table 7.

Figure 3:
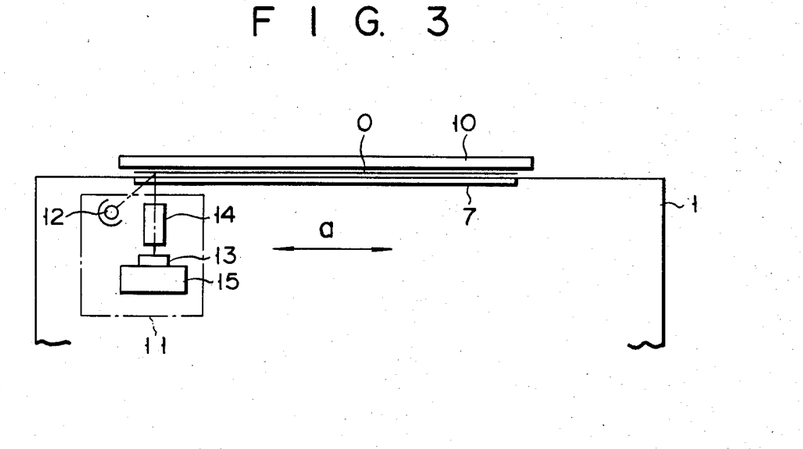
FIG. 3 shows a partial side view of a document scanning section of the copy machine of FIG. 1.
Figure 4:
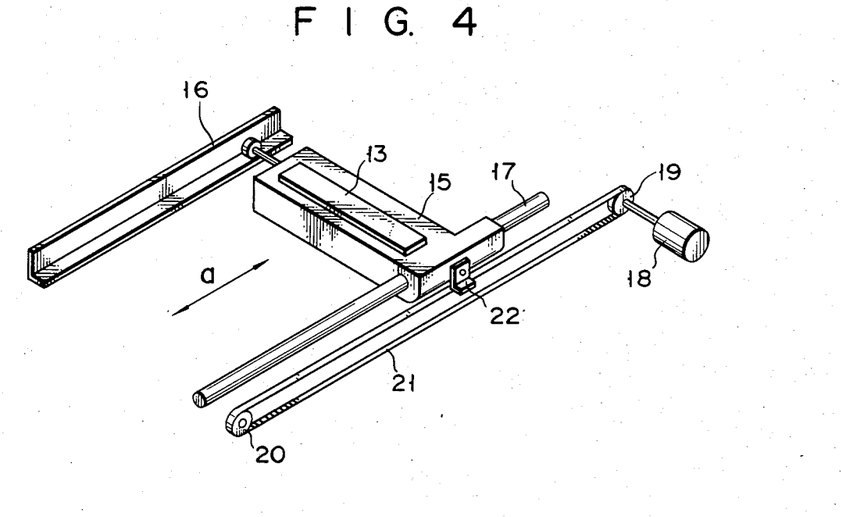
FIG. 4 perspectively illustrates a scanner drive mechanism in the document scanning section shown in FIG. 3.

The structural arrangement of the scanning means 8 is best illustrated in FIGS. 2 to 4. The document table 7 is fixed to the top surface of the main frame 1. Below the document table 7, a scanner 11 is provided for optically scanning a document 0 (FIG. 3) set on the document table 7, and reads out the image information on the document 0. The scanner 11 is comprised of a lamp 12 for illuminating the document 0, a photoelectric converter 13 for receiving the light reflected from the document 0 and converting it into a corresponding electric signal, an optical system 14 containing lenses, for example, for guiding the reflected light from the document 0 to the photoelectric converter 13, and a carriage 15 for movably supporting those components. The photoelectric converter 13, made of a CCD type line image sensor, converts the reflected light from the document 0 into color signals of green (G), yellow (Y) and cyan (C) representing the image information of the document 0. The carriage 15 is supported by the guide rail 16 and the guide shaft 17 and is reciprocately movable in the directions of arrowheads a, as shown in FIG. 4. A drive pully 19 driven by a reversible scanning motor 18, for example, a pulse motor, is disposed adjacent to one end of the guide shaft 17, while a follower pulley 20 is disposed near the other end thereof. A timing belt 21 is wound around these pulleys 19 and 20, and is fixed to part of the carriage 15. With the forward or reverse rotation of the scanning motor 18, the carriage 15 rectilinearly moves in the direction of arrowhead a.

Figure 5:
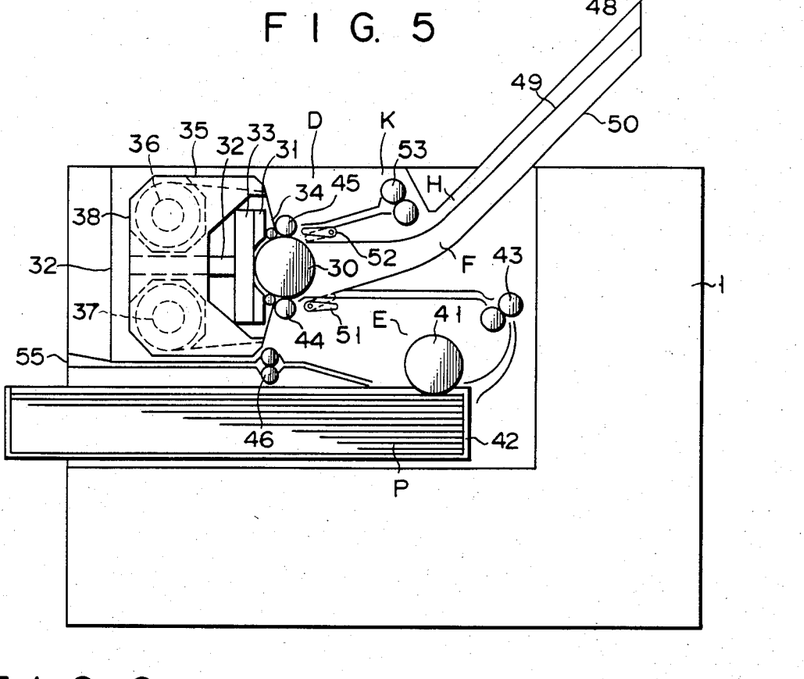
FIG. 5 shows a longitudinal sectional view of an image forming section of FIG. 1.

The image forming means 9 is structurally arranged as shown in FIGS. 2 and 5, for example. A platen roller 30 is disposed near at the center of the image forming means 9. A thermal head 31 is disposed at the left of and to confront the platen roller 30. The thermal head 31 is mounted to a radiator 33 formed integrally with the back end face of a holder 32. A ribbon cassette 35 housing a rolled thermal ink ribbon 34 as thermal transfer material is removably set against the holder 32. The thermal ink ribbon 34 is partially interposed between the thermal head 31 and the platen roller 30. The platen roller 30, the thermal head 31 and the thermal ink ribbon 34 make up a transfer section D (image forming section). As shown, the ribbon cassette 35 has a case 38 in which a pair of roll shafts 36 and 37 are provided upright and to be parallel with each other, and the thermal ink ribbon 34 is fixed at both ends respectively to and wound around the roll shafts 36 and 37. The case 38 has an opening through which part of the thermal ink ribbon 34 is exposed to the outside. The thermal ink ribbon 34 is slightly pulled out and set between the platen roller 30 and the thermal head 31. When the ribbon cassette 35 is loaded into the holder 32, the roll shafts 36 and 37 are respectively coupled with the drive shafts of the motors such as pulse motors, through a drive force transmission mechanism (not shown). More specifically, the ribbon cassette 35 is put in and pulled out of the holder 32, through an opening 39 formed in the right side of the main frame 1. A cover 40 provided for the opening 39 is hingedly fixed to open and close to the main frame 1.

A feed roller 41, disposed on the lower left side of the platen roller 30, picks up and takes out sheet by sheet the image forming medium such as paper P stacked in a cassette 42, by means of the feed roller 41. In this case, the feed roller 41 rotates in press contact with the paper P. The paper P taken out by the feed roller 41 is transferred to a pair of resist rollers 43 disposed on the upper left of the feed roller 41. The resist roller pair 43 aligns the leading end of the paper P, and then feeds it toward the platen roller 30. The paper P is pressed against and around substantially half of the surface of the platen roller 30 through press rollers 44 and 45, as shown. This pressed paper ensures an accurate transfer of the paper P. The feed roller 41, the cassette 42 and the resist roller pair 43 make up the paper feed section E. The cassette 42 is removably set to the main frame 1 on the front side, as shown in FIG. 2. A pair of manual feed rollers 46 as best illustrated in FIG. 5 manually feed a desired paper (not shown) into the machine.

Figure 6:
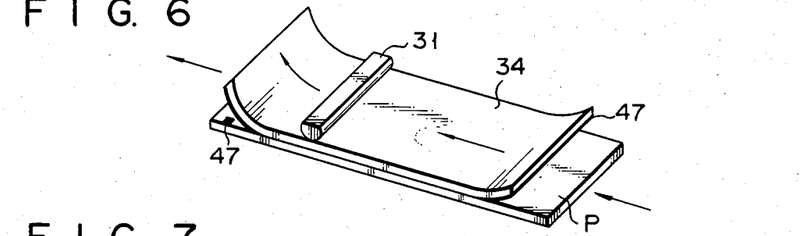
FIG. 6 diagramatically illustrates a transfer operation of the image forming section shown in FIG. 5.
Figure 7:
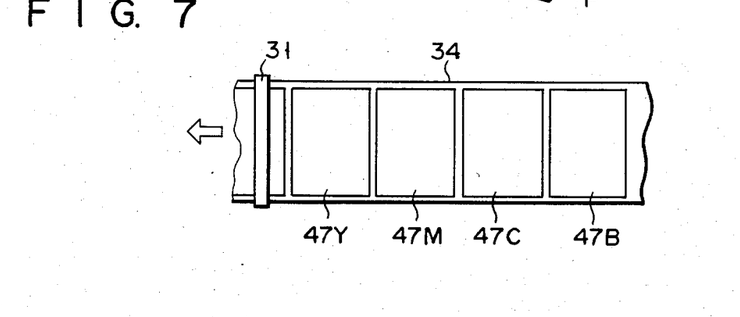
FIG. 7 shows a plan view of a thermal transfer ink ribbon used in the image forming section shown in FIG. 5.

The thermal head 31 presses the paper P against the platen roller 30, through the thermal ink ribbon 34. Under this condition, if ink 47 as a coloring material which is coated over the thermal ink ribbon 34 is heated, it is transferred to the paper P. A typical example of the thermal ink ribbon 34, each having the same width as the paper P, is illustrated in FIGS. 6 and 7. As shown, ink sections 47Y, 47M, 47C and 47B for yellow (Y), magenta (M), cyan (C) and black (B) are arranged side by side on the thermal ink ribbon 34. In operation, specific colors are transferred one by one to the paper P and are exactly superposed on the previously transferred color portion.

During this color transfer operation, the paper P reciprocates between the color transfer position and the transfer start position. The number of the reciprocating motions of the paper P is equal to the number of specified colors. Then, the paper P is directed to either the first or second guide plate 49 or 50 disposed along the lower side of a discharge tray 48 which projects at a slant upward from the upper surface of the main frame 1. More specifically, the paper P is directed by first and second directing gates 51 and 52 respectively located between the platen roller 30 and the ends of the first and second guide plates 49 and 50. In operation, the paper P taken out of the cassette 42 is transferred through the resist roller pair 43 and the first directing gate 51, and the leading end thereof is set on the platen roller 30. The paper P is transferred at a fixed speed along and in contact with the peripheral surface of the platen roller 30, with rotation of the platen roller 30 as driven by the pulse motor (not shown). At this time, the holder 32 having a linear array of heating elements (not shown), which extends along the axis of the platen roller 30, is heated to transfer one of the inks 47 on the thermal ink ribbon 34 onto the paper P. The paper P in contact with the platen roller 30 is directed at the leading end to the first guide plate 49 by the second directing gate 2, which at this time is positioned as indicated by a continuous line, and is transferred to the first guide plate 49 laid under the discharge tray 48. In this way, one color ink 47 is transferred to the paper P. Upon the completion of the color transfer, the platen roller 30 is reversed in rotation to return the paper P to the transfer start position. At this time, the first directing gate 51, when swung to the position indicated by a two-dot chain line, guides the trailing end of the paper P to the second guide plate 50 laid under the first guide plate 49. In this way, the paper P is reciprocately moved a plurality of times, thereby transferring a plurality of colors to the paper P. As all of the colors of ink 47 are transferred to the paper P, the paper is led to a discharge roller pair 53 by the second directing gate 52 when swung to the position as indicated by the two-dot chain line. Finally, the paper P exits onto the discharge tray 8. The portion defined between the second guide plate 50 and the first guide plate 49 provides a first temporary storing section F. A portion defined between the first guide plate 49 and the discharge tray 48 provides a second temporary storing section H. The discharge tray 48 and the feed roller pair 53 form a discharge section K.

Figure 8:
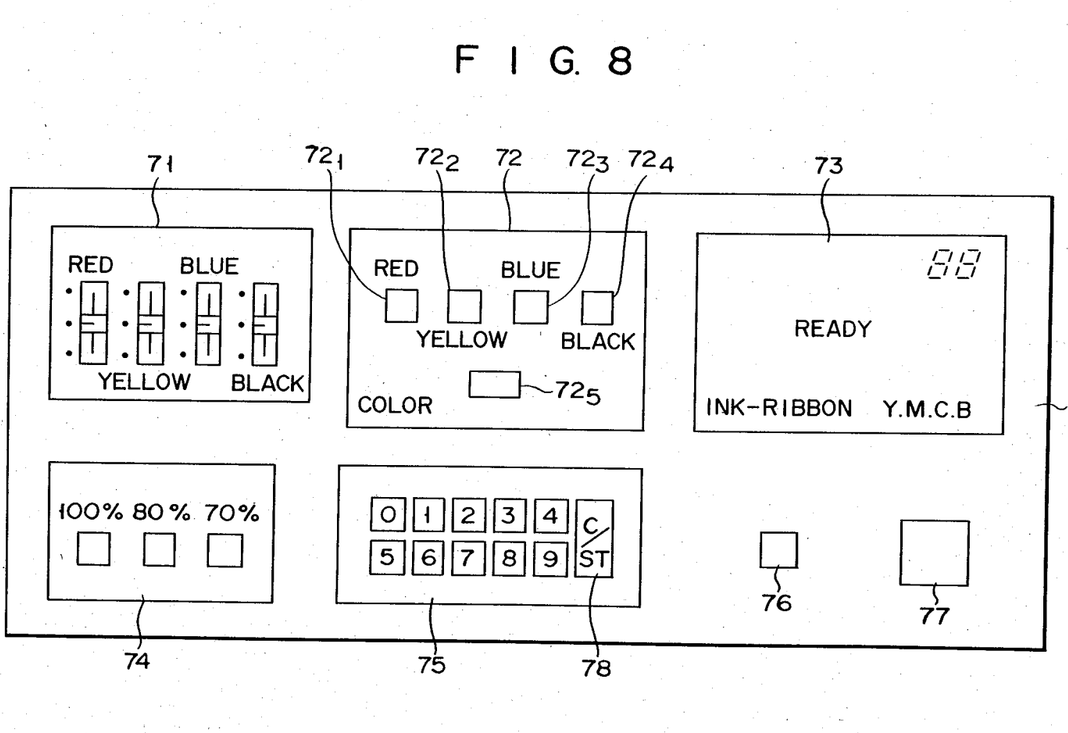
FIG. 8 shows a plan view of an operation panel of the copy machine of FIG. 1.

FIG. 8 shows in detail the operation panel 2. In the figure, a density setter 71 is used to set the density of each color, for example, red, yellow, blue or black. A color setter 72 is used for designating the desired color of each copy such as red, yellow, blue or black. A display window 73 displays various machine operations, for example, the number of copies, if it is ready to copy or print, the color of the thermal ribbon as set, and the other operating states of the machine. A multiplication setter 74 sets the desired magnification of the copy, i.e., 100%, 80%, or 70%. A ten key section 75 sets the desired number of copies. A wedge key 76 sets the wedge copy. A start key 77 starts the copy operation. The color setter 72 includes a red select key $72_1$, a yellow select key $72_2$, a blue select key $72_3$, a black select key $72_4$ and a color select key $72_5$. When the red select key $72_1$ is pushed, the color red is designated and only the color red is printed. Similarly, when the red select key $72_1$ and the black select key $72_4$ are pushed, red and black are designated and only these colors are printed. When the color select key $72_5$ is pushed, all of the colors, red, yellow, blue and black are designated for the copy. These keys each contain an indicating lamp, and when pushed, the lamp lights up with the designated color. When the power is on, the color select key $72_5$ lights to indicate that the all-color copy mode has been set in the copy machine. A clear/stop key 78 for correcting the number of copies set or for stopping the copying operation is further contained in the ten key section 75.

Figure 9:
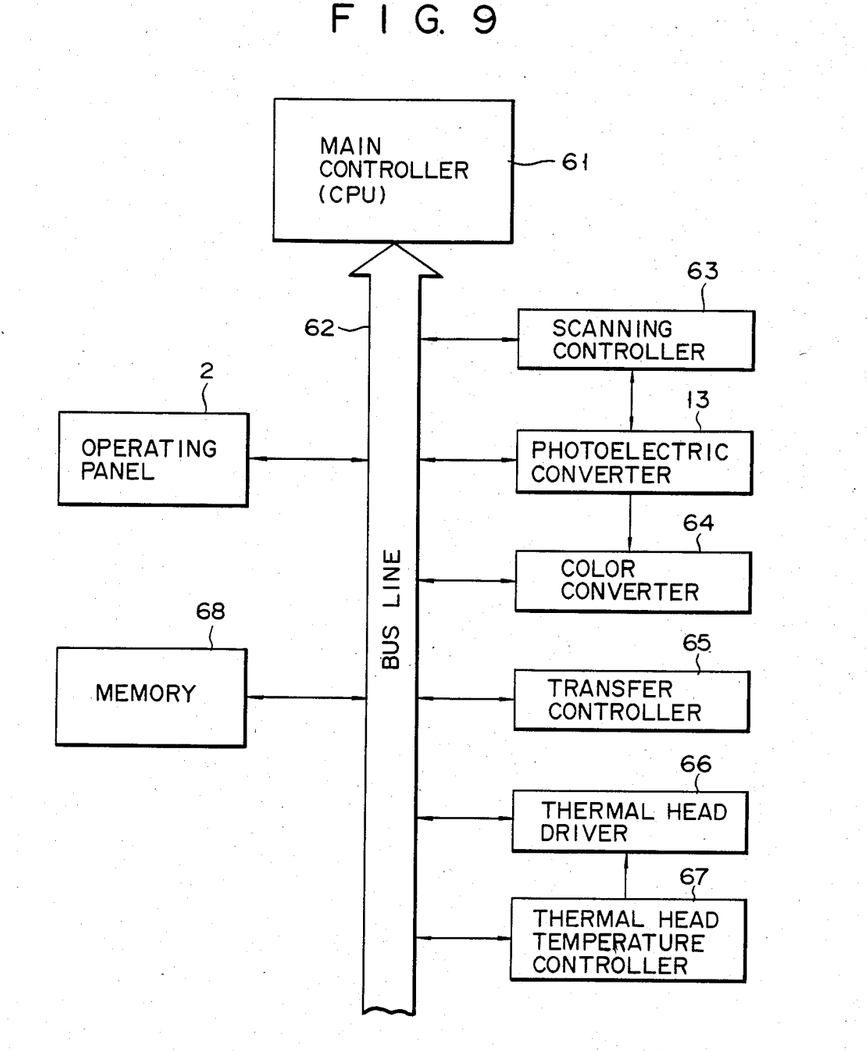
FIG. 9 shows a block diagram of a control circuit used in the copy machine shown in FIG. 1.

Turning now to FIG. 9, there is shown in block form a control circuit for controlling the operation of the overall mechanism of the thermal color copy machine structurally arranged as mentioned. A main controller 61, composed of a central proccessing unit (CPU) and its peripheral circuit, controls the operation of the overall copy machine including the interrupt operation. The main controller 61 is coupled with a bus line 62, which is also connected to the operation panel 2, the scanning controller 63, the photoelectric converter 13, the color converter 64, the transfer controller 65, the thermal head driver 66, the head temperature controller 67, and the memory 68. In response to a signal transferred through the bus line 62 from the main controller 61, the scanning controller 63 drives the lamp 12, the photoelectric converter 13 and the scanning motor 18 in the scanner 11. The photoelectric converter 13 responds to a signal from the bus line 62 from the main controller 61 to pick up the image information on the document, and produces a color light signal, as mentioned above. The color converter 64 processes the signal coming from the photoelectric converter 13 to convert it into color signals representing one or all of the inks, yellow (Y), magenta (M), cyan (C) and black (B). The color signals are produced onto the bus line 62. The color converter 64 also color converts a signal sent from the bus line 62, appropriately processes it, and again sends the processed signal to the bus line 62. The transfer controller 65 operates in response to the signal transferred through the bus line 62 from the main controller 61, and controls a motor to drive the platen roller 30, a motor to drive the roll shafts 36 and 37 of the ribbon cassette 35, a motor to drive the feed roller 41, the resist roller pair 43, the discharge pair 53, and further solenoids (not shown) to drive the first and second directing gates 51 and 52. The thermal head driver 66 operates in response to a signal coming through the bus line 62 from the main controller 61 and a signal from the head temperature controller 67, and energizes the heating elements of the thermal head 31. The head temperature controller 67 responds to a signal coming through the bus line 62 from the main controller 61 to operate and send a temperature control signal to the thermal head driver 66. The memory 68 responds to a signal coming through the bus line 62 from the main controller 61, and allows the information transferred through the bus line 62 to be stored therein or the information stored therein to be read out therefrom.

How the thermal color copy machine is controlled by the control circuit will next be described. A normal copying operation of the copy machine will first be given referring to FIG. 10. Since, starting by power on, in step Sl, the control waits for the start key 77 to turn on. As soon as it is turned on, the control proceeds to step S2. In step S2, the scanner 11 is driven to start the scanning of the document 0. Through scanning, the image information on the document 0 is picked up in the form of light color signals of green (G), yellow (Y) and cyan (C). Then, the control advances to step S3. In this step, it is checked as to whether the number of colors as specified by the operator by means of the color setter 72 on the operation panel 2, is more than one. If only one color is specified, the control flows to step S4. More specifically, when the document to be copied is a color document containing a plurality of colors such as red, yellow, blue and black (the ground color of the paper is not included), and only one of those colors is selected, the control flows to step S4. In this step, the light color signal derived from the scanner 11 is sent to the color converter 64. The color converter 64 converts it into a color signal for the corresponding ink. Specifically, if the thermal ink ribbon 34 has four colors, yellow (Y), magenta (M), cyan (C) and black (B), as already mentioned, the light color signals of "$\alpha$" level for green, "$\beta$" level for yellow, "$\gamma$" for cyan, are respectively converted into corresponding ink color signals, "d level" for yellow, "e level" for magenta, "f level" for cyan, and "g level" for black. Here, $\alpha$, $\beta$, and $\gamma$ represent respectively the output levels of the photoelectric converting elements of the photoelectric converter 13 in the scanner 11, and may take voltage or current values. d, e, f and g may be the temperature levels applied to the thermal ink ribbon 34 or voltage levels applied to the heating elements of the thermal head 31. In this way, color conversion is performed in step S4. Upon completion of color conversion, the next step S5 is executed. In this step, only the color signal specified is selected from the color signals and stored in the memory 68. For example, if an operator pushes the red select key $72_1$ to specify red, the color signal for the red ink, "$d_R$ level" for yellow, and "$e_R$ level" for magenta are selected and stored in the memory 68. After the storing of those color signals, the next step S6, is executed. In this step, the ink color signal is read out from the memory 68, and the read out signal drives the thermal head 31 in the ink section containing the thermal ink ribbon 34 to thermally transfer the ink color as specified by the read-out signal onto the paper P. For example, when a yellow color signal is stored in the memory 68, the color signal of the yellow "$d_R$ level" is read out, and drives the thermal head 31 to thermally transfer yellow ink from the yellow ink section 47Y of the thermal ink ribbon 34 to the paper P. Then, the color signal of the magenta "$e_R$ level" is read out, and the ink of the magenta ink section 47M is thermally transferred to the paper P. In this case, the magenta is superposed onto the transferred yellow portion on the paper P. In this way, only one color (red in the above example) as specified is copied.

Figure 10:
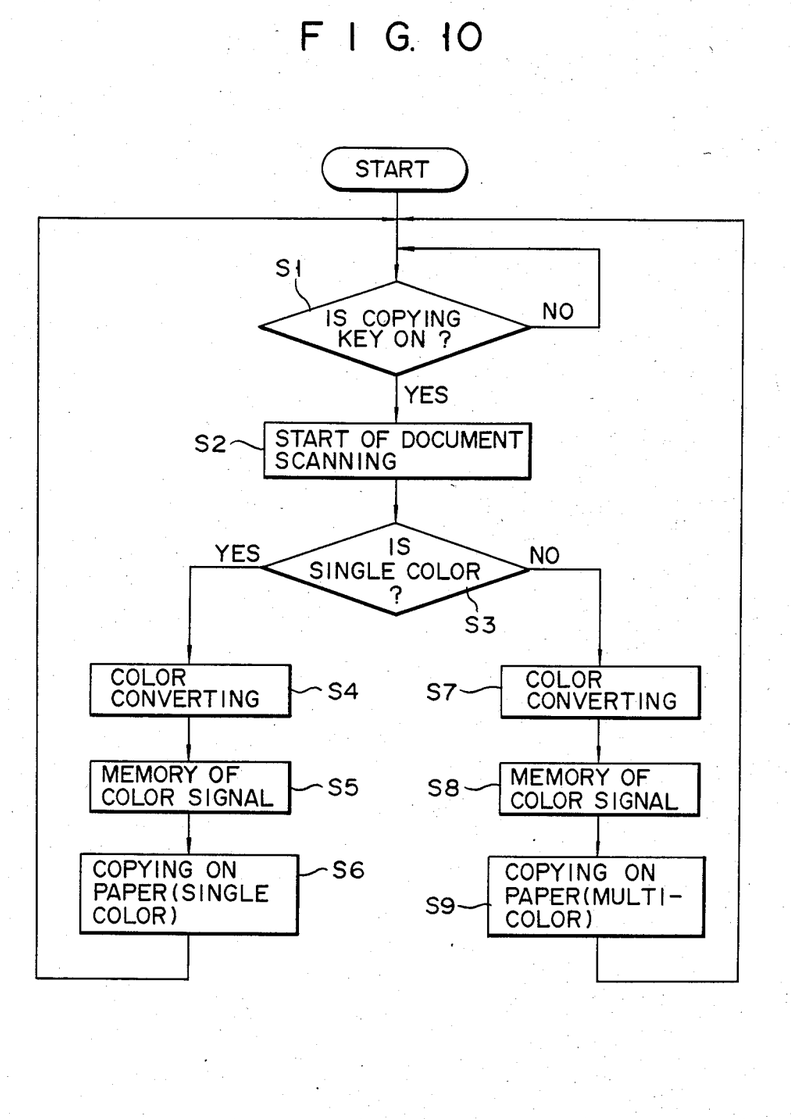
FIG. 10 charts a control flow by the control circuit of FIG. 9.

On the other hand, in step S3, when a plurality of the specified colors is specified, the control goes to step S7. For example, when a plurality of colors such as red and blue, or red, yellow and blue of the color document, or when all of the colors of the color document are specified, step S7 is executed. In this step, a processing similar to that of step S4 is executed, and then the control flows to the next step S8. In step S8, a processing similar to that of step S5 is performed, and then the next step S9, is executed. In this step, the processing is similar to that of step S6. In this way, a plurality of colors as specified is copied.

Figure 11:
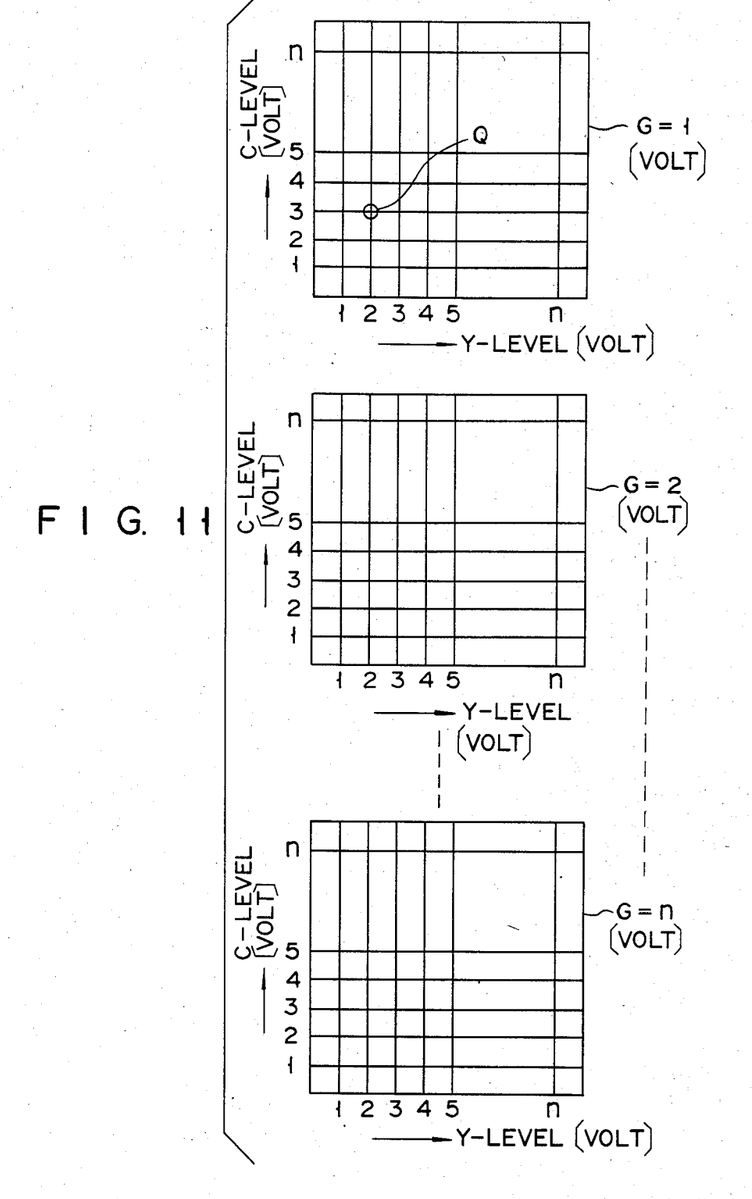
FIG. 11 illustrates a sequence of color conversion steps by the control circuit of FIG. 9.

Color conversion by the color converter 64 is performed in the following way. This will be described referring to FIG. 11. The color converter 64 stores a plurality of tables for converting light color levels into ink color levels, as shown in FIG. 11. Assume now that the light color signals are three, the first for green (G), the second for yellow (Y) and the third for cyan (C), and that the levels of the voltages from the photoelectric converter 13 in the scanner 11 are: $G=1$ V, $Y=2$ V, and $C=3$ V. In this case, in the color converter 64, a color conversion table of $G=1$ V is searched. After such table is gained, the color of the ink stored at the coordinates Q for $Y=2$ V and $C=3$ V in the table is read out. If the thermal ink ribbon 34 has four colors, yellow (Y), magenta (M), cyan (C) and black (B), the read out is $Y=d$ level, $M=e$ level, $C=f$ level and $B=g$ level. In this way, color conversion is performed.

Figure 12:
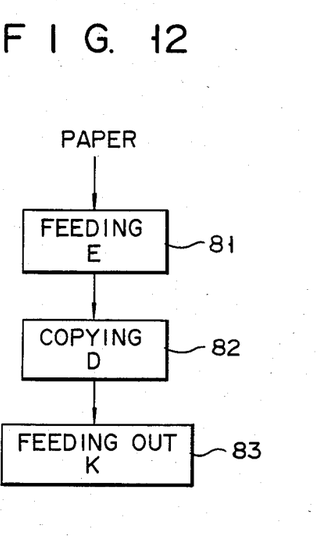
FIGS. 12 and 13 show flow charts of the paper as it moves in the image forming section of FIG. 1.
Figure 13:
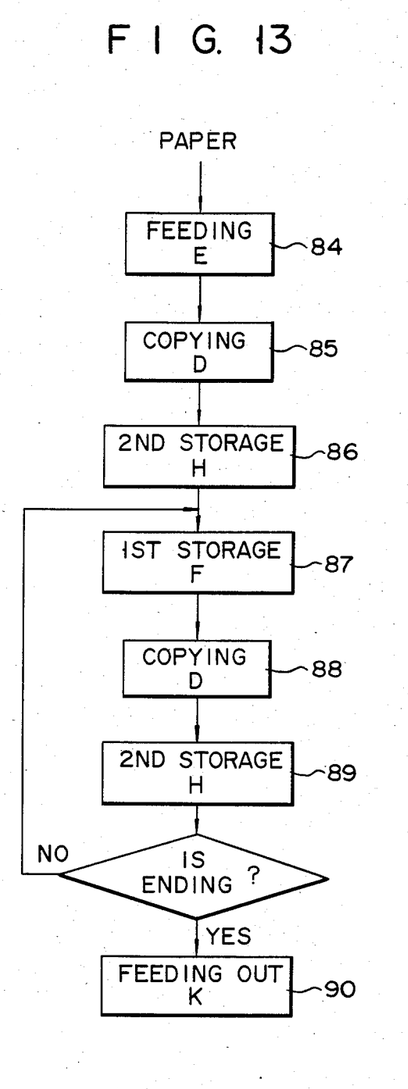

The control operation of the copy machine when the clear/stop key 78 is turned on to interrupt image forming will next be described. This operation mode consists of two modes, a waiting mode (before the start key 77 is turned on) and an on-copy mode (after the start key 77 is turned on). In the waiting mode, when the clear/stop key 78 is turned on, the number of copies displayed is "1". If "10" has already been set and displayed, it changes to "1". If "1" has been already set, the display "1" remains unchanged. In the on-copy mode, the control contents differ from the above and depend on the location of the paper P processed in the image forming means 9. This will be discussed in detail referring to FIGS. 12 and 13. FIGS. 12 and 13 illustrate how the paper P moves in the image forming means 9. For example, in the case of a single color copying of black or red, the paper P fed from the cassette 42 travels through the route of places 81–83, namely, through the feeding section E, the transfer section D, and the discharge section K, as shown in FIG. 12. Next, in the case of copying a plurality of colors, the paper P travels through the route of places 84–90, as shown in FIG. 13. Of this route, the segment 87–89 is repeated according to the specified colors. The motors used for transferring the paper P through the routes 81–83 or 84–90 are the pulse motors for driving the platen roller 30, the feed roller 41 and the resist roller pair 43, respectively. These pulse motors are of course controlled by the main controller 61 and the transfer controller 65.

To interrupt the copying operation, it is necessary to know where the paper P is in the image forming means 9. This can be done by using the known sensor means (not shown). The present embodiment, however, is designed on the assumption that finding the paper P in the image forming means 9 is performed concurrently with the drive/control of the respective pulse motors for driving the rollers 30, 34, 43, 53, and the like by the main controller 61 and the transfer controller 65. More specifically, when the control sections 61 and 65 drive and control the pulse motors, it is checked as to which motors are running and what number of drive pulses can be applied to the motors. Mainly, this check can be made by only the main controller 61.

The traveling of the paper P in the image forming means 9 when the clear/stop key 78 is turned on in a single color copy mode, will be described referring to FIG. 12. When the paper P is in the cassette 42 and the clear/stop key 78 is turned on before the paper is fed, the copy machine is in the waiting mode, not in the on-copying mode. When the paper P is fed into the paper feed section E (place 81) and if the clear/stop key 78 is turned on, the paper P passes through the platen roller 30 and the thermal head 31 (transfer section D), and is temporarily stored in the second holder or storing section H. In this case, the thermal head 31 does not operate and no color is transferred to the paper P. Then, the paper P is returned to the first holder or storing section F passing the platen roller 30 and the thermal head 31. This traveling of the paper P is similar to that in the segment 87–89 of FIG. 13 which will be, described later. During this operation, the thermal head 31 is not operated, and no color transfer is performed in the place 88 acting as the color transfer or copying section. Under this condition, the waiting mode is set up. In this mode, when the start key 77 is turned on again, the paper is not fed from the cassette 42, and the paper P temporarily stored in the first temporary holder F is moved forward and subjected to copying. If the copy is made onto a plurality of papers, the paper P stored in the first temporary holder F is alone used, and the paper stored in the cassette 42 is taken out and used for the remaining paper. When the paper P is in the transfer section D as denoted by 82 in FIG. 12, and if the clear/stop key 78 is pushed, the transfer operation by the thermal head 31 is stopped, the paper P is sent to the discharge section K, and the waiting mode is set up in the copy machine. At this time, if the start key 77 is turned on again, the paper P is taken out from the cassette 42 and subjected to copying.

The control operation of the copy machine when the clear/stop key 78 is turned on in the plural color copy mode will be described referring to FIG. 13. The copy machine operates as in the single color copy mode when the clear/stop key 78 is turned on before the paper is fed when the paper P is in the cassette 42, and when it is turned on when the supplied paper P is located in the paper feed section E denoted as 84. When the clear/stop key 78 is turned on and the paper P is located in the first temporary holder F denoted as 87 in FIG. 13, the paper P goes directly from the place 87 to the place 90. That is to say, the paper P is transferred from the first temporary holder F through the transfer section D to the discharge section K, and finally is fed out to exterior. Under this condition, the copy machine is in the waiting mode, and the thermal head 31 is not operated. When the start key 77 is again turned on, the paper P is taken out from the cassette 42 to be copied. When the paper P is located in the transfer section D (place 88) and if the clear/stop key 78 is turned on, the copy machine operates as in the single color copy mode. When the paper P is located in the second temporary holder H (place 89), and if the clear/stop key 78 is turned on, the paper P in the second temporary holder H is returned to the first temporary holder F, is again passed through the transfer section D, is sent to the discharge section K, and is finally discharged outside the copy machine. Under this condition the copy machine is in the waiting mode, and the thermal head 31 is not operated. Here, if the start key 77 is again turned on, the paper P is fed from the cassette 42 for copy.

As described above, the interruption control operation of the copy machine when the clear/stop key 78 is turned on consists of two operation modes, the single color copy mode and the plural color copy mode. Further, the interruption control operation of the copy machine differs depending on where the paper P is located in the image forming means 9. With these features, paper is saved, and the occurrence of a jam is minimized. For example, when the paper P is in the feed section E, if the clear/stop key 78 is turned on, the paper P is temporary stored in the first temporary holder F, and the stored paper is used for the next copy. This feature saves paper. When the clear/stop key 78 is turned on, it is switched to another operation mode, as illustrated in FIGS. 12 and 13. This feature reduces the time needed for the clear/stop key 78 to turn on before the next copy operation is allowed. In turn, this time reduction greatly contributes to the prevention of jamming. For example, when the clear/stop key 78 is turned on, if the paper P is sent directly to the discharge section K, irrespective of its location, a jam tends to occur. In this connection, for example, when the paper P is in the second temporary holder H, if the paper is transferred from the second temporary holder H to the discharge section K, the paper curls in the opposite direction. This may possibly cause jamming. It is for this reason that the time reduction is effective in preventing jamming. Additionally, the stoppage of the thermal head 31 when the clear/stop key 78 is turned on, saves electric power and also prevents the wasteful use of the thermal ink ribbon 34.

While in the above-mentioned embodiment, paper is used for the image forming medium, any material may be used if it accepts the thermal transfer of ink. OHP film, for example, may be used. The thermal transfer of ink for image forming may be replaced by any other type of transfer.

The present invention can be applied to the thermal color copy machine, and can be applied to, for example, an electronic photographic type laser printer with a scanning means for scanning a document for picking up image information.

As seen from the foregoing, in the interruption control system for the image forming apparatus according to the present invention, the interruption of the image forming is optimumly controlled according to the present location of the paper P. Therefore, jamming of the paper can be prevented, and paper can be saved.

What is claimed is:

1. A color image forming apparatus with interruption control, comprising:
   a color specifying section, which can selectively specify one color or a combination of colors from a plurality of prepared colors for image formation;
   an image data outputting section for outputting data for image formation;
   a supply section for supplying a medium on which an image is formed;
   an image forming section for moving said medium, which is supplied from said supply section, back and forth the number of times corresponding to the color and the number of colors specified by said color specifying section and for forming said image data from said image data outputting section on said medium with one or more colors specified by said color specifying section;
   first and second temporary storage sections, provided on input and output sides of said image forming section for temporarily and selectively storing said medium when said medium is moved back and forth by said image forming section;
   a discharge section for discharging said medium on which the image forming operation has been completed by said image forming section;
   first control means for outputting specified control signals necessary for the normal operation of said medium in relation to said supply section, image forming section, first and second temporary storage sections, and the discharge section, and for recognizing the current position information of said medium based on said control signals;
   interruption command section which includes at least a stop command section;
   second control means for discriminating whether said medium is in said supply section, image forming section, first or second temporary storage section, or in said discharge section, by receiving the current position information of said medium from said first control means which has received the interrupt command from said interrupt command section; and
   third control means for receiving the discrimination result from said second control means and selectively supplying a suitable interruption processing signal to said supply section, image forming section, first or second temporary storage section, and discharge section as required for each interruption processing of said medium corresponding to the discrimination result.

2. A color image forming apparatus with interruption control according to claim 1, wherein said third control means receives the discrimination result that said medium is in said supply section from said second control means, and supplies a first interruption processing signal to said supply section, image forming section, and first and second temporary storage sections, to move said medium from said supply section to said first temporary storage section via said image forming section, second temporary storage section and image forming section without performing the image forming operation, and move said medium, which has been moved from said first temporary storage section, to said image forming section at the time of the next image forming operation.

3. A color image forming apparatus with interruption control according to claim 1, wherein said third control means receives the discrimination result that said image forming medium is in said image forming section from said second control means, and supplies a second interruption processing signal to said image forming section and discharge section, to move said medium from said image forming section to said discharge means without performing the image forming operation.

4. A color image forming apparatus with interruption control according to claim 1, wherein said third control means receives the discrimination result that said medium is in said first temporary storage section from said second control means, and supplies a third interruption processing signal to said first temporary storage section, image forming section and discharge section, to move said medium from said first temporary storage section to said discharge section via said image forming section without performing the image forming operation.

5. A color image forming apparatus with interruption control according to claim 1, wherein when said third control means receives the discrimination result that said medium is in said second temporary storage section from said second control means, and supplies a fourth interruption processing signal to said image forming section, said first and second temporary storage sections, and discharge section, to move said medium from said second temporary storage section to said discharge means via said image forming section, first temporary storage section and image forming section without performing the image forming operation.

* * * * *